United States Patent [19]

Einto

[11] 3,999,472
[45] Dec. 28, 1976

[54] CONVERTIBLE GRILLING DEVICES
[75] Inventor: Risto Einto, Tikkurila, Finland
[73] Assignee: Sini-Tuote Einto & Einto, Tikkurila, Finland
[22] Filed: June 3, 1975
[21] Appl. No.: 583,432
[30] Foreign Application Priority Data
June 10, 1974 Germany .................. 2427869
[52] U.S. Cl. .................. 99/340; 99/421 HH; 126/25 R
[51] Int. Cl.² .................. A47J 37/07
[58] Field of Search ............ 99/339, 340, 421, 446, 99/450; 126/9, 25, 29

[56] References Cited
UNITED STATES PATENTS

| | | | |
|---|---|---|---|
| 1,332,879 | 3/1920 | Beskow | 99/340 UX |
| 2,048,769 | 7/1936 | Anderson | 126/29 |
| 2,502,685 | 4/1950 | Warner | 99/421 HH |
| 2,515,521 | 7/1950 | Loffredo | 126/9 |
| 2,638,888 | 5/1953 | Molla | 99/339 X |
| 2,690,497 | 9/1954 | Wiggins | 99/340 X |
| 3,096,706 | 7/1963 | Cardwell | 99/340 |
| 3,230,948 | 1/1966 | Schmitt | 99/421 HH X |
| 3,358,587 | 12/1967 | Hunt et al. | 99/421 H |

Primary Examiner—Leonard D. Christian
Assistant Examiner—Arthur O. Henderson
Attorney, Agent, or Firm—Pennie & Edmonds

[57] ABSTRACT

A convertible grilling device of the type heated by solid fuel, in particular by charcoal, is disclosed comprising a stand, an upper frame and a removable substantially box-or parallelepiped-shaped fuel container. Said fuel container has guide pegs engaged in rigid guides and may be converted from a horizontal to vertical working position and vice versa. The fuel container is supported free of any securing or clamping means and is flush within the frame when in the horizontal working position.

9 Claims, 5 Drawing Figures

CONVERTIBLE GRILLING DEVICES

BACKGROUND OF THE INVENTION

Numerous grilling devices are known in which the fuel container can be used in both a horizontal and vertical position so that when the fuel grid is horizontal steaks, sausages and suchlike may be grilled on it (or above it on a separate grid), and when it is vertical chickens etc. may be grilled on spits in front of it. Most of these devices have the disadvantage that the fuel container pivots about an axis which runs approximately through its centre of gravity and that particular fastening screws or other mechanisms must be loosened before moving the fuel container into a new desired working position and must then be tightened again. Such a movement is particularly difficult if it must be undertaken when the grilling device is in use. Handling the fastening screws or mechanisms is particularly problematical due to the fact that the fastening screws or mechanisms are in direct contact with the strongly heated fuel container. Furthermore, in the case of the majority of the known devices of this type, particular tools such as a spanner or a screwdriver are required to be able to undertake any movement of the fuel container.

In addition there is a device disclosed in U.S. Pat. No. 3,182,585 in which rigid guide slots are provided which accomodate threaded pins. By means of wing-nuts the fuel container may be set and fastened in the desired position. However this device suffers from the disadvantages already discussed in that it can only be moved with difficulty because the nuts become too hot.

BRIEF SUMMARY OF THE INVENTION

It is the main object of the invention to produce a grilling device of a simple type which can, even when in use, be simply and rapidly displaced from the vertical to the horizontal position and vice versa, especially without need for the use of particular tools and without the danger of burns resulting from handling the heated screws or clamps.

According to the invention the fuel container is suspended free of any screwing or clamping means. Rigid guides are secured to an upper frame of the stand in such a manner that in the horizontal working position the fuel container is flush positioned within the frame and is movable out of the horizontal position into a stable vertical working position and vice versa by means of guide-pegs secured to the fuel container. In this way the fuel container can simply be moved from its vertical to its horizontal position and vice versa without the need for tools and, in particular, without having to loosen any form of screw or clamp fastening which results in a considerably reduced risk of burns occurring. At the same time, due to the fact that the fuel container nests inside the stand when in the horizontal position, the stand forms a protection against burns because there are air gaps provided between the fuel container and the upper frame of the stand which surrounds the fuel container with the result that the user cannot come directly into contact with the fuel container.

In a preferred embodiment of the invention the fuel container is mounted in the upper frame without both screws and clamps in such a way that it may be freely lifted out. In other words a grilling device constructed in accordance with the invention comprises two constructional units i.e. the stand and the fuel container which can be easily separated from one another and just as easily assembled without any particular tools being necessary.

Advantageously the guides may be constructed as sliding guides arranged at right angles to one another on the rigid side plates which simultaneously form the supports for the spits, the guides in the lower portion of the side plates being horizontal guides and those in the rear portion of the side plates being vertical. Preferably the horizontal guide is an open-topped guide channel and the vertical guide is a laterally closed guide slot which is open at the top and opens at the bottom into the horizontal guide. The fuel container can thus easily be placed from above into the guides by means of the guide pegs and thereupon be slid into the desired position. In order to ensure the stability of each position, the guide pegs are arranged in substantially the same plane as the centre of gravity of the fuel container. The guide pegs are preferably provided near their free ends with a circumferential groove engaging the edge of the guides thus preventing the guide pegs from slipping out of the guides if the fuel container is tilted. More importantly this ensures that the guide pegs engage the guides.

In order to prevent the fuel from falling out when the fuel container is vertical or being moved, an angle plate is provided, which with the help of fishplates can be fitted onto the lower edge of the fuel container.

In a further preferred embodiment of the invention a back plate is provided to serve as a plate for catching fat, this plate, which may be inserted into slots on the side plates, protects the grilling grid from behind and in particular from the wind when the grilling grid is horizontal. This fat catching plate is only actually required for catching dripping fat when the fuel container is in the vertical position and thus has a dual function.

So as not to have to use the fuel grid, which covers the front of the fuel container and stops the fuel falling out, as the grid for the meat to be cooked, a special grilling grid is provided. For this purpose and in this connection the invention furthermore provides slots for the grilling grid on the back and side wall which form the holder for the grilling grid. There are preferably a large number of sets of slots arranged above one another so that the grilling grid may be set at different heights above the fuel container and, amongst other things, allows variation in the cooking time.

The overall advantages achieved by the invention mainly lie in that, in comparison with the known devices having a displaceable fuel container, both the construction and handling of the device are very much simpler and that no screwing or fastening of the fuel container is necessary. When the device is in use it can easily be moved from one working position to the other, which means that it can also easily be filled or refilled with fuel. If the device is, for example, being used to grill a chicken i.e. in the vertical position, and it becomes necessary to put in more fuel, it is easy to swing the fuel container into the horizontal position, pull the fuel grid out, put in the fuel, and then swing the fuel container back into the vertical position. Seen as a whole the construction is considerably more stable than known devices of this type.

BRIEF DESCRIPTION OF THE DRAWINGS

Other and further objects of the present invention will be apparent from the following description and claims and are illustrated in the accompanying drawings which by the way of illustration show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

The drawings show in.

DETAILED DESCRIPTION OF THE PREFERRED EMBODIMENTS

Figure 1:
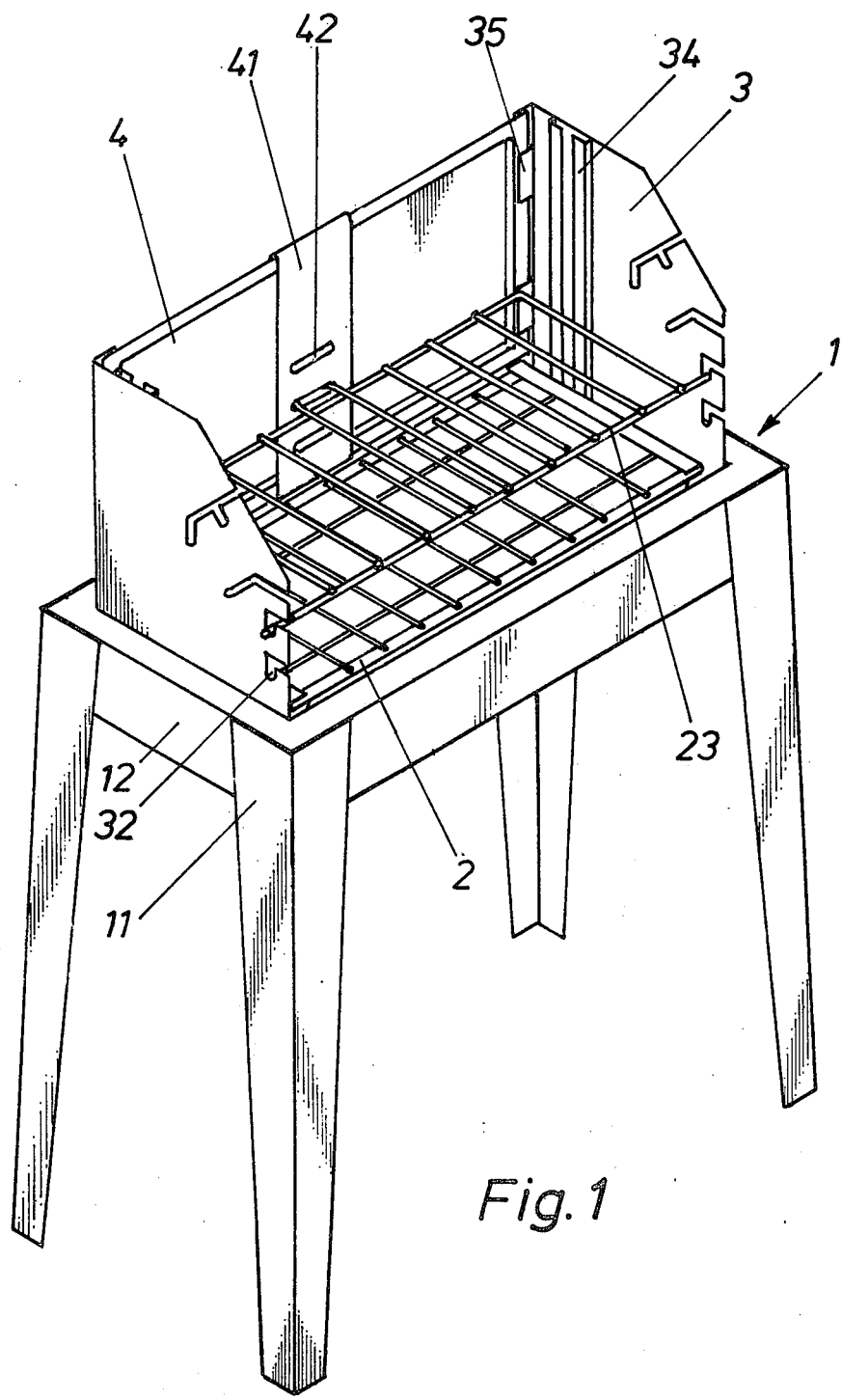
FIG. 1 an axonometric view of a grilling device constructed in accordance with the invention in one working position.

The grilling device constructed in accordance with the invention basically comprises a stand 1 and a fuel container 2. It is an important feature of the invention that the stand 1 and the fuel container 2 are two easily separable units. The stand 1 is provided with feet 11 which may if desired be fitted with rollers or such like which are not shown in the drawing for the sake of clarity. The feet 11 are fixed to an upper frame 12 which receives the fuel container 2. Also not shown in the diagrams for the sake of clarity is a number of small receptacles on the stand for seasonings, drinks, cutlery etc., as well as hand-holds and other small additions which may be made for the sake of convenience or of facilitating or improving use of the device.

Figure 2:
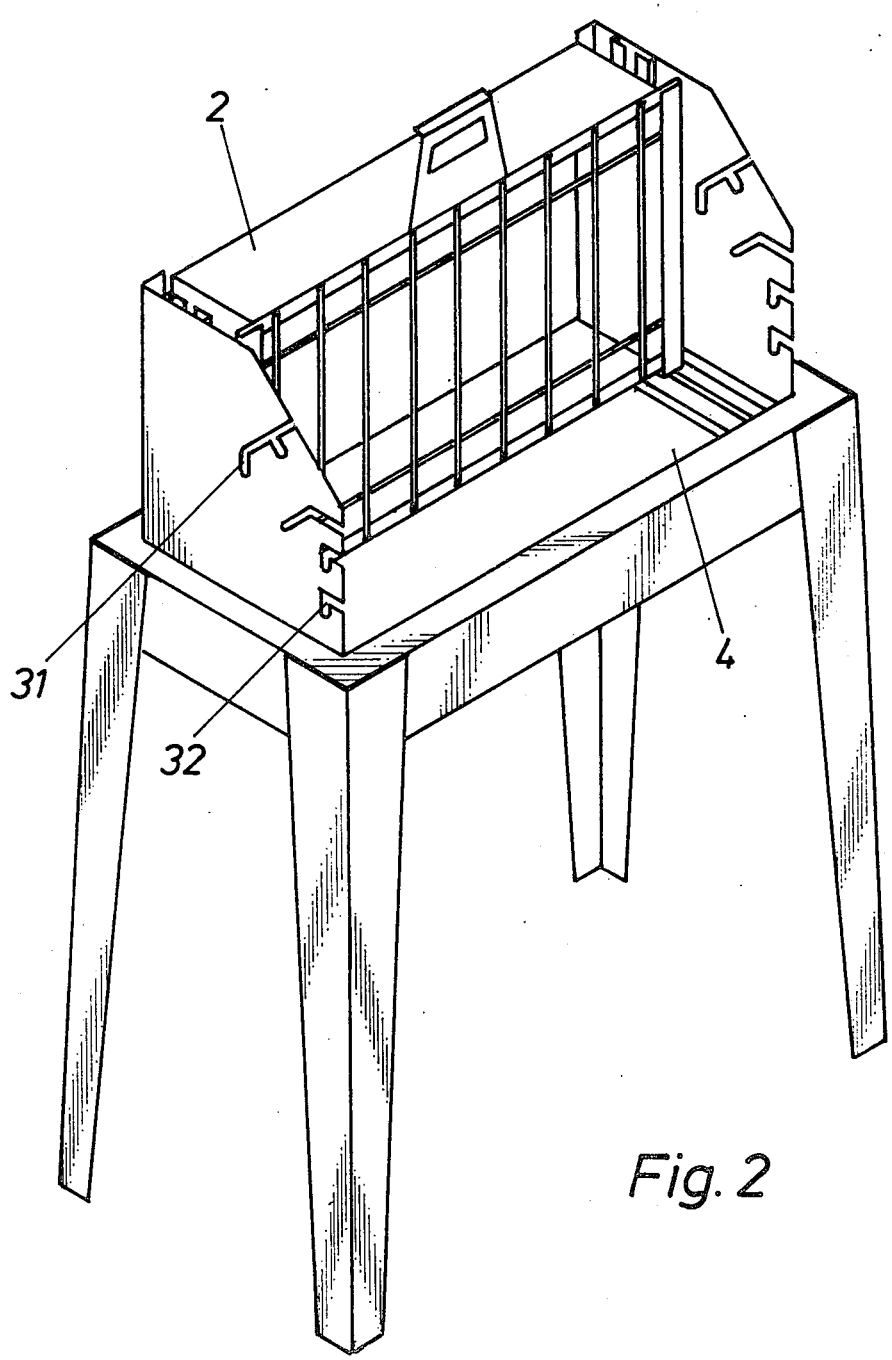
FIG. 2 an axonometric view of the grilling device in the other working position.

Along the shorter edge of the opening of the upper frame 12 for receiving the fuel container 2 there are side plates 3 provided, which in this case are firmly screwed to the upper frame. However, the side plates 3 can be provided so as to be movable and lockable in their working position. These plates act as a lateral wind shield. In addition, each plate 3 carries one horizontal guide 33 and one vertical guide 34 for supporting the fuel container 2. Furthermore there is provided a number of slots 32 in the side plates for the grilling grid 23 and further slots 31 (see FIG. 2) for one or more spits which are not shown. On the rearward edge (see FIG. 1) of the side plates 3 are slots 35 in the form of tabs bent out from the side plates, which are adapted to receive the back plate 4, when in the horizontal position. The back plate 4 is preferably the fat-catching tray which is only required when the device is in the vertical working position (see FIG. 2) and in that position is slid into guides, which are not further described, situated either on the side plates 3, in the upper frame 12, or in the fuel container 2.

Figure 4:
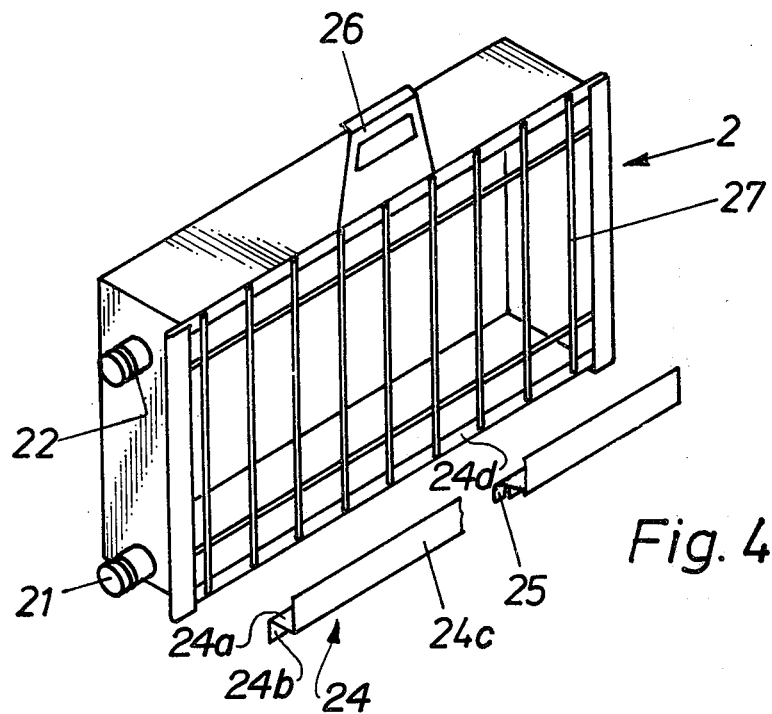
FIG. 4 a view of the fuel container.

Secured to each of the side walls of the fuel container 2 are two guide pegs 21 each of which has a circumferential groovve 22 which cooperates with the horizontal guide 33 and the vertical guide 34 as described in more detail below. The fuel container is covered in the front or on top when it is vertical or horizontal, respectively by a fuel grid 27 which is mounted in lateral guides and may easily be lifted out. When the fuel container is in the horizontal position there is a grilling grid 23 set above the fuel grid 27 so as to support the food to be grilled. When the fuel container is in the vertical position there is an angled plate 24 (see FIG. 4) provided so as to prevent the fuel falling out of the fuel container, which can happen all too easily, and thus preventing the fat-catching plate from becoming dirtied. The plate generally indicated at 24 comprises a piece of metal such as sheet metal or the like bent at right angles to provide three panels 24a, 24b, and 24c. When the fuel container 2 is in the vertical position the plate 24 is removably attached along the lower edge thereof to an upstanding flange 24d in such a manner that the panel 24a is substantially horizontal and the upstanding panel 24c extends vertically upwardly in front of the fuel grid 27 to help retain the fuel such as charcoal. The plate 24 is attached by means of tabs 25 bent out from the lower panel 24b at intervals therealong to lie in a plane spaced from but substantially parallel to the plane of the panel 24b. These tabs 25 pass between the vertical bars of the grid 27 and engage over and behind the upstanding flange 24d of the fuel container 2 while the major portion of the panel 24b lies outside (toward the viewer in FIG. 4). In addition there is a handgrip 26, on the fuel container 2, by means of which the fuel container may be easily moved.

In order to be able to support the grilling grid 23 in a reasonable fashion when the fuel container is horizontal there is a clamping strip or fixture 41 provided for the back plate 4. This clamping strip 41 has a number of slots 42 for the grilling grid which are set at the same height as the slots 32 in the side plates. By arrangement of a plurality of sets of grid slots 32 and slots 42 above one another the possibility if afforded of setting the grilling grid 23 at various heights above the fuel container 2. The clamping strip 41 is a simple strip of plate, whose length is substantially the same as the width of the back plate 4, and whose ends are so bent as to grip the edges of the back plate 4. This fastening can easily be undone when the back plate 4 is required as a fat-catching plate.

Figure 3:
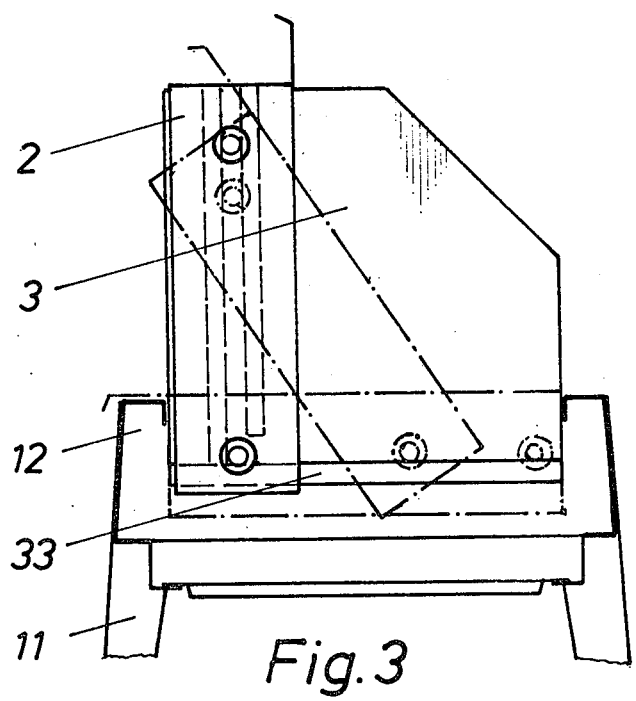
FIG. 3 a sectional view of a part of the device.
Figure 5:
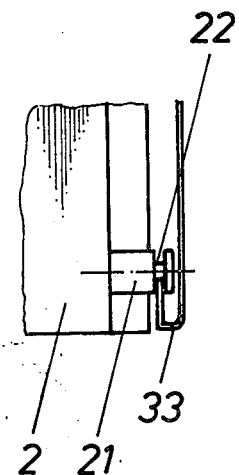
FIG. 5 a view of a portion of the hanging arrangement and guide on an enlarged scale.

The mounting position of the fuel container 2 with respect to the stand 1, or the side plates 3, may simply be changed from the vertical to the horizontal position or vice versa without using special tools or loosening screws in the following manner: the horizontal guide 33 (see FIG. 5) comprises an open-topped track or guideway which extends over the whole width of the side plate 3. The upper free edge of the horizontal guide 33 engages the circumferential groove 22 on the peg 21, so that the peg 21 is practically undisplaceable in the axial direction, i.e. apart from the play between the groove 22 and the horizontal guide 33. The vertical guide 34 on each of the side plates 3 comprises basically two angle plates. Each of these angle plates is fastened by one limb to the side plate 3, while the respective two free limbs are directed at one another with a free slit between them. These two free limbs grip the groove 22 on the peg 21, while the broader end of the peg runs in the track and the peg can in this case also not be displaced in the axial direction. At the lower end of the vertical guide 34 there is provided a gap in the front side limb of the vertical guide 34, as seen in FIG. 3, which permits a free passage of the lower guide peg 21 along the horizontal guide 33, while the rear angle forms an abutment so that the fuel container cannot slide further back than to the position shown with solid lines in the diagram.

The fuel container 2 may be simply swung from the vertical working position into the horizontal position by pulling on the hand grip 26 in an anti-clockwise direction (see FIG. 3) and thereby pushing the lower guide peg 21 to the right along the horizontal guide 33. The fuel container 2 thus moves through the intermediate position shown with dotted lines into the horizontal working position which is also shown with dotted lines in which position the hand grip 26 may if necessary serve as an additional support on the back portion of the upper frame 12. The upper of the guide pegs are now in the position in which, when in the vertical position the lower ones were to be found. The lower ones are now positioned in the region close to the front edge of the upper frame 12. Moving the fuel container 2 from the horizontal into the vertical working position is carried out by substantially the same steps in the reverse order.

Instead of the embodiment described above a further possibility is to omit the side plates and mount the guides directly on the stand. In that case the spit-holders must be provided directly on the fuel container which is often designated as fire trough.

The particular advantage of the device (apart from its ability to be used in both the horizontal and vertical positions and to be moved easily between these two positions) is that the fuel container may be inserted and removed from the stand without using any tools. Furthermore any spits present need not to be removed.

What is claimed is:

1. A convertible grilling device of the type described comprising a stand, an upper frame supported by said stand, a pair of spaced substantially horizontal guides, means supporting said guides from said frame, a pair of spaced substantially vertical guides, means for supporting said vertical guides from said upper frame, the bottom end of each of said vertical guides communicating with an end of a horizontal guide, a substantially rectangular fuel container having lateral sides, each of said lateral sides having at least one guide peg extending laterally therefrom, said guide pegs being moveable along and engageable with either of said pairs of guides, said guide pegs also being moveable from a position in engagement with one of said pairs of guides to a position in engagement with the other pair of guides by passing through the point of communication between said vertical guides and said horizontal guides said fuel container having its major plane selectively securely positioned either substantially horizontal or substantially vertical depending upon which pair of guides are engaged by said pegs, and said fuel container being free of any means for securing it in place in either selected position other than gravity whereby said container may at any time be moved manually from one selected position to the other without prior unclamping, loosening of fastenings or the like.

2. The device of claim 1 in which said means supporting one of said pair of guides comprises a pair of side plates, each of said side plates being secured to said upper frame and each of said one pair of guides being secured to one of said plates.

3. The device of claim 1 in which said means supporting said pairs of guides comprises a pair of side plates, each of said side plates being secured to said upper frame, one of each of said pairs of guides being mounted on one of said plates, and the other of said pairs of guides being mounted on the other of said plates.

4. The device of claim 3 in which each of said side plates has therein at least one slot of a pair of aligned slots for receipt of a spit.

5. The device of claim 1 in which said horizontal pair of guides comprise an upwardly opening, generally U shaped channel; said vertical pair of guides each comprise a pair of facing channel shaped members each having one of their facing legs opposed to and spaced from the opposing leg of the other member to provide a guide slot, and one of each pair of said facing channels having its lower end aligned with and spaced above its respective horizontal guide to provide said communication for said guide pegs between said horizontal guides and said vertical guides.

6. The device of claim 1 wherein there are two pairs of guide pegs extending laterally from said fuel container for selective engagement with said horizontal and vertical guides.

7. The device of claim 6 wherein there are two pairs of guide pegs extending laterally from said fuel container for selective engagement with said horizontal and vertical guides.

8. The device of claim 7 in which said fuel container has a plate removably secured along one of its sides for retaining fuel in the container when the container is in the vertical position.

9. The device of claim 8 in which a back plate is provided, said back plate being removably secured between said side plates in a vertical position.

* * * * *